United States Patent [19]
Harrison et al.

[11] Patent Number: 6,072,521
[45] Date of Patent: Jun. 6, 2000

[54] HAND HELD APPARATUS FOR SIMULATING TWO WAY CONNECTIVITY FOR ONE WAY DATA STREAMS

[75] Inventors: Edward R. Harrison, Beaverton; Dale R. Call, Aloha; John A. Throckmorton, Lake Oswego; Burt Perry, Beaverton, all of Oreg.

[73] Assignee: Intel Corporation, Santa Clara, Calif.

[21] Appl. No.: 09/003,403

[22] Filed: Jan. 6, 1998

Related U.S. Application Data

[63] Continuation-in-part of application No. 08/490,822, Jun. 15, 1995.

[51] Int. Cl.$^7$ .................................................. H04N 7/10
[52] U.S. Cl. .............................. 348/12; 348/13; 348/552; 455/6.3
[58] Field of Search .................................. 348/12, 10, 13, 348/6, 1, 553, 552; 455/6.3, 3.1, 5.1; 45/1, 2

[56] References Cited

U.S. PATENT DOCUMENTS

| | | | |
|---|---|---|---|
| 5,307,055 | 4/1994 | Baskin et al. ................................. | 345/1 |
| 5,347,304 | 9/1994 | Moura et al. . | |
| 5,499,046 | 3/1996 | Schiller et al. . | |
| 5,513,180 | 4/1996 | Miyake et al. . | |
| 5,519,433 | 5/1996 | Lappington et al. ........................ | 348/2 |
| 5,526,023 | 6/1996 | Sugimoto et al. ....................... | 345/173 |
| 5,583,864 | 12/1996 | Lightfoot et al. . | |
| 5,594,491 | 1/1997 | Hodge et al. . | |
| 5,613,192 | 3/1997 | Ikami et al. . | |
| 5,831,664 | 11/1998 | Wharton et al. .......................... | 348/13 |

OTHER PUBLICATIONS

PCT International Search Report for International Application No. PCT/US98/27441.

*Primary Examiner*—Victor R. Kostak
*Attorney, Agent, or Firm*—Blakely, Sokoloff, Taylor & Zafman LLP

[57] ABSTRACT

A hand held device for use to separately render associated data is disclosed. The hand held device includes a display element, a processor, and a communication interface. The communication interface operates to receive rendering commands of the associated data from a host device, which received the associated data in conjunction with primary data, and subsequently separated the associated data from the primary data. The processor causes the associated data to be rendered on the display element. The hand held device further includes an enclosure for housing the display element etc., which has physical dimensions that are suitable for hand held usage while viewing the primary data, which are separately rendered.

23 Claims, 13 Drawing Sheets

HAND HELD APPARATUS FOR SIMULATING TWO WAY CONNECTIVITY FOR ONE WAY DATA STREAMS

RELATED APPLICATIONS

The present application is a continuation-in-part application to U.S. patent application Ser. No. 08/490,822, filed on Jun. 15, 1995, entitled System And Method For Simulating Two Way Connectivity For One Way Data Streams.

BACKGROUND OF THE INVENTION

1. Field of the Invention

This invention relates to enhancing one-way broadcast data transmissions. More particularly, it relates to enhancing the quality and content of a primary information stream by creating and transmitting associated data which provides the appearance of an interactive connection to secondary sources of information.

2. Background

One of the limitations of nearly all forms of electronic mass media such as radio, television, audio CD's and video cassettes is that the communication of information or data is one-way from provider to the consumer. The characteristics of one-way sources of data are that the data is sent sequentially and is fleeting or at best can be recorded for later playback. And a consumer cannot interact with the data provided to seek additional information or services.

There is a desire by electronic mass media consumers for additional services, and provider of television and radio broadcast services are looking for new sources of revenue. In particular, consumers are looking for information or data that is related to what they are viewing in the media. The additional information may be in the form of details on the content of the current program such as the recipe of a meal being demonstrated on a cooking show or biographies of actors in a drama or historical background information on events depicted in a program. Or, it could be program highlights such as key plays from the baseball game. In addition, consumers would like access to real time data such as stock price, updated baseball scores as they occur, traffic and weather conditions. Also, consumers would like to have access to special services associated with product advertising such as information on where to buy nationally advertised products—possible with a map to the nearest location, or the ability to instantly receive coupons.

Recently, on-line services such as provided by the World Wide Web of the Internet have become available. Such services provide access to immense amounts of data on an interactive basis by linking digital computers together over sophisticated communications networks. At the same time, the cost of digital computing power is falling rapidly. For example, many homes now have one or more computers. And home computers have displays capable of showing television as well as audio capability. They also have memory and computing power.

But while such services are generally available and computers are becoming more widespread, finding relevant information is an arduous task that may take hours of searching even for an experienced user.

In addition, these services require a 2-way connection from a consumer's location to the on-line network. In the consumer market, prolonged utilization of a single phone line for 2-way digital communications is expensive.

Up until now, there has been no way for producers of mass market broadcast programming to deliver data associated by its relevancy to its subject matter that could be interactively displayed and manipulated by consumers on a real time basis. What is meant by real time is that the consumer receives and has access to the relevant data during the process of program reception. Therefore the data becomes an integral part of the experience desired by the program producers.

Although received during a program, the information is retained and may be traversed by the consumer at a later time, as if they were connected in a 2-way fashion to an on-line service.

3. Prior Art

Perhaps the earliest effort to address the foregoing needs is for program content providers to include a telephone number in either the radio of television broadcast. The consumer is invited to dial a number for additional information. However, this telephone number is part of the primary data stream which is transitory.

A second attempt is the provision of closed caption programming for the hearing impaired on television. This takes the form of written text appearing somewhere on the television screen typically at the bottom and requires a special decoder on the television. The text is a written rendition of the audio portion of the television program. That is, it is a recapitulation of the information supplied by the primary data provider and is not stored or saved for later access by the consumer.

Television networks also use a part of the unused bandwidth in the video signal to send the schedule of programs coming up on that network. One network is sending a comprehensive program listing in digital format over an unused section of the NTSC bandwidth. This is called an electronic program guide ("EPG"). A second network uses a portion of the unused NTSC bandwidth to send digitally encoded stock quotes and the subject matter of the topics covered in the news broadcast, and extended data services ("XDS") sends the date, time, name of a scheduled program, type of program and how much of the program remains. Cable services provide additional detail about songs being played on subscriber digital audio services such as digital music express ("DMX(tm)"); The detail typically consists of the name of the artist, the name of the song and the album. A system called Gemstar(tm), provides information in digital format that enables consumers to record programs by referencing a number in a program guide.

Many of the foregoing services are provided on broadcast television only over what is called the vertical blanking interval (the "VBI"). The VBI is a portion of the bandwidth defined for broadcast television and in the case of NTSC, for example, consists of the first 21 of the 525 raster lines that define a video frame. SECAM and PAL have a similar arrangement. Of the 21 lines, line 21 is divided into two frames of 60 hz bandwidth each. The closed caption is provided in the first frame of line 21.

None of the foregoing allow a consumer to experience apparent interactively with external data sources. That is, none provides data that persists for more than a few seconds and none allows the consumer to manipulate directly that data.

SUMMARY OF THE INVENTION

A hand held device for use to separately render associated data is disclosed. The hand held device includes a display element, a processor, and a communication interface. The communication interface operates to receive rendering commands of the associated data from a host device, which received the associated data in conjunction with primary data, and subsequently separated the associated data from the primary data. The processor causes the associated data to be rendered on the display element. The hand held device further includes an enclosure for housing the display element etc., which has physical dimensions that are suitable for hand held usage while viewing the primary data, which are separately rendered.

BRIEF DESCRIPTION OF THE DRAWINGS

The preferred embodiments of the invention will now be described in connection with the drawing wherein.

DETAILED DESCRIPTION OF THE INVENTION

An electronic mass media provider may be said to deliver a one-way stream of electronic data. This stream of data is herein referred to as a primary stream of data and includes live or pre-recorded information that is created by the broadcasting and entertainment industries for the purpose of delivery to consumers over delivery mediums such as broadcast television, video cassettes, radio and audio CD's. The content of the primary data streams typically created by production studios for mass distribution to the consumer market. Often a distributor produces all or part of the programming content. For example, a local television news station obtains pre-produced video news and advertising content from national providers and inserts locally produced content and advertising for broadcast. Equipment used in the television industry are video cameras and video recorders. Typically, the primary data is organized into programs. A primary stream of data can be rendered intelligent to a consumer as either audio or video or a combination of the two.

The term associated data as used herein refers to a stream of data generated separately from the primary data but having content that is relevant to the primary data in general and usually relevant to a particular program of primary data and is in this sense associated. Associated data is intended to enhance the utility of the primary data stream, but if it is not available, the primary data stream can stand on its own merits. The creation process typically uses commercially available software and hardware that output industry standard file formats such as Hypertext Markup Language (HTML) for text and graphic layout, Graphics Interchange Format (GIF) Joint Photographic Expert Group (JPEG) formats for still images, and so forth.

Figure 1:
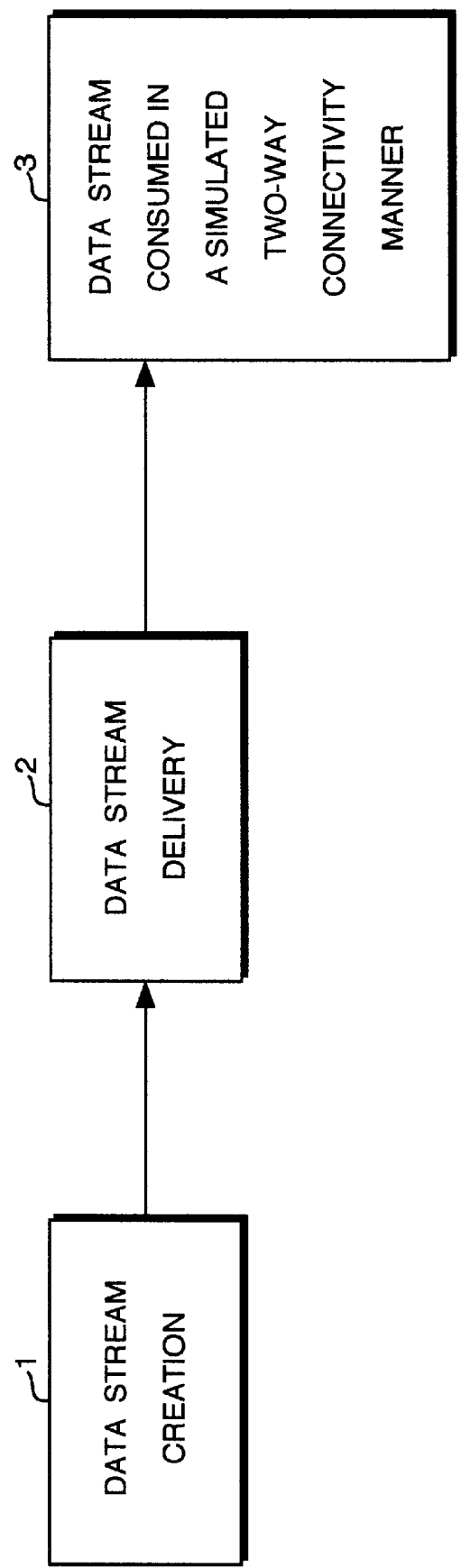
FIG. 1 is a block diagram of the invention at the highest level of abstraction.

FIG. 1 is a block diagram of the invention at the highest level of abstraction. Referring now to FIG. 1, data stream creation unit 1 performs the function of generating both the primary data stream and the associated data stream. The two data streams may or may not be merged to create a combined stream of primary and associated data. The two data streams are supplied to non-interactive delivery unit 2 which performs the function of delivering the two data streams to the consumer. The non-interactive delivery unit includes delivery by broadcast, cable or a packaged media such a as cassettes and audio CD's. Indeed, non-interactive delivery is intended to include all one-way electronic data delivery systems. The primary data stream and secondary data stream are typically transmitted to a consumer over the same delivery medium; however, the invention contemplates situations where this is not the case. For example, the primary data stream could be delivered by broadcast television and the associated data could be delivered over a high speed digital network, a FM sideband, a direct satellite broadcast, a cable network, a telephone, etc.

When the delivered data reaches consumer 3, it is decoded from its delivery medium. That is, if it is sent by broadcast television, the consumer decodes the signal, separates the primary data from the associated data, and stores the associated data for future use. The primary data is consumed with or without the associated data. However, when consumed with the associated data, the consumer may selectively interact with the associated data, simulating a two-way connectivity for the one way data streams.

Figure 2:
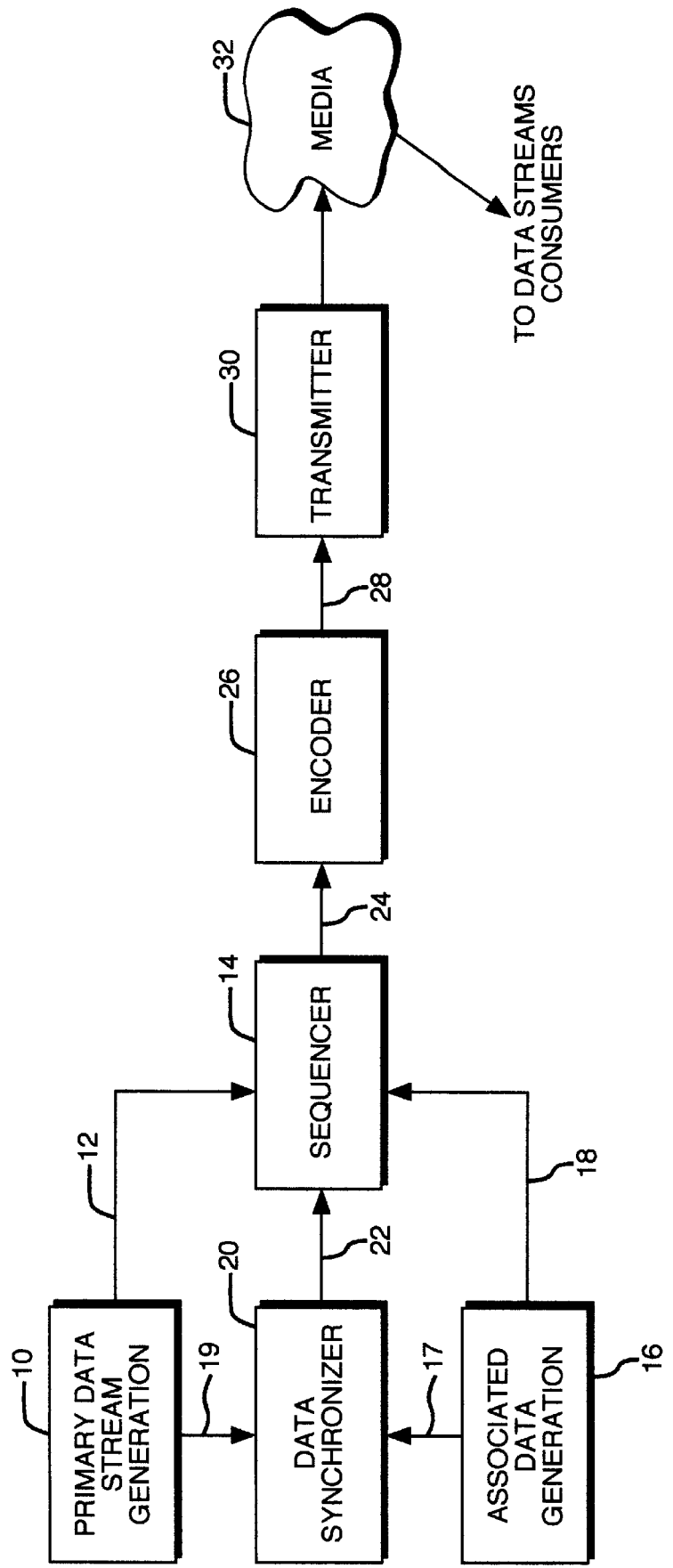
FIG. 2 is a block diagram showing one embodiment of the data streams creation and delivery aspects of a system according to the present invention.

FIG. 2 provides additional system detail for one embodiment of the present invention. Referring now to FIG. 2, reference numeral 10 refers to the primary data stream generation sub-system. The output of primary data stream generation sub-system is typically an analog signal. However, it may be a digital signal as in the case of digital broadcast television. Data channel 12 connects primary data stream generation sub-system 10 and sequencer 14 and data channel 19 connects it to data synchronizer 20. Data channels 12 and 19 may be initiated by a live video feed, or analog or digital tape. Reference numeral 16 refers to an associated data generation sub-system. The output of associated data generation sub-module 16 is a digital signal that is supplied over digital data link 18 to sequencer 14 and over digital data link 17 to synchronizer 20. The digital data links of the system may be a conventional digital connection such as a serial or parallel or it may be a network link. Typical connecting media would be twisted pair, co-axial cable, fiber optic cable or a wireless media.

Reference numeral 20 refers to a data synchronizing sub-system whose function is to synchronize the primary data stream generated by sub-system 10 with specific associated data. The input to data synchronizing sub-system 20 is scene information from the primary data stream in the form of time codes and time duration's, and data from associated data generator sub-system 16. It creates a so called script for the delivery and display of associated data at specific points in time. For example, data synchronizer 20 creates a script that specifies that a detailed data sheet will be delivered to the consumer prior to a specific television product advertisement, and that the data sheet will be displayed on the consumer's display when a certain television advertisement starts.

Data synchronizer 20 typically includes software which is patterned after common digital video editors such as Adobe's Premiere, which places parallel video and audio tracks on a standard time line such as SMPTE (Society of Motion Picture and Television Engineers) time code. This allows segments of each track to be manipulated independently but with reference to a common time line so that segments may later be reconstituted. The software of data synchronizer 20 allows associated data to be laid out and manipulated on an additional data track. The size of particular associated data components is coordinated with the known bandwidth of the delivery medium. The user of data synchronizer 20 typically specifies that a unit of information should be displayed at a specific point in time. Data synchronizer 20 then calculates the time required to transfer the data and inserts a transfer specification into the script at the appropriate point prior to the display instruction. The output of data synchronizer sub-system 20 is a digital signal representing a script that synchronizes the output of primary data stream sub-system 10 and associated data stream generator 16.

The output of the data synchronizer 20 is supplied over digital data link 22 to sequencer sub-system 14. Digital data link 22 is a conventional digital link. Sequencer 14 combines the primary data stream with the associated data as specified by the script supplied by synchronizer sub-system 20. Sequencer 14 monitors the output from primary data stream sub-system 10 to obtain the information necessary to sequence transmission of associated data. For example, during the broadcast of a television program, data sequence 14 obtains a time code information such as SMPTE time code which is generated by the primary data stream. The information is used to coordinate mixing of associated data with primary data systems. In addition, sequencer 14 mixes other data feeds that are being transmitted over the same delivery medium. These may include external data services such as financial data, emergency broadcast information or weather information. Mixing of existing data streams is necessary only for delivery mediums that don't support separate, independent transmission of digital information. This function has the capacity to be used for the delivery of either live or pre-recorded programming, or a combination of both. For live programming, such as a local evening news program, the data stream sequencer takes input directly from the outputs of primary data stream generator 10, data synchronizer 20, associated data generator 16, and time code form the primary data stream. For pre-recorded programming, this function processes the output of the data synchronizer 20 and sequences the broadcast of associated data with the primary data.

The output of sequencer 14 is supplied over conventional digital data link 24 to encoder 26. Encoder 26 is a hardware component for insertion of digital information into the particular delivery medium that will be received by the consumer. If the delivery medium is broadcast television, encoder 26 inserts this information directly into the NTSC television signal, and this delivers both the primary and associated data over a single delivery medium, broadcast television radio waves. Encoder 26 accepts input streams of both video and serialized digital information. It breaks the serialized digital information up into a series of packets, and modulates the packets into the ("VBI") of the video signal. Encoder 26 is commercially available hardware and software. A number of vendors market hardware for insertion and extraction of data into and from standard (NTSC/PAL) television signals. Norpak Corporation, EEG, Inc., and WavePhore, Inc. are examples.

The output of encoder 26 is supplied via digital data link 28 to transmitter sub-system 30 which performs the function of physically transmitting radio frequency waves into the atmosphere. Such transmitters may be television or radio broadcast transmitters or a satellite broadcast system. Also, the data may be stored on a tape for later transmission. Reference numeral 32 refers to the delivery media which may be radio frequency electromagnetic waves passing through the atmosphere, a video tape, a laser disk, an audio CD and the like. For the later media, transmitter 30 becomes a video tape recorder, video or audio CD recorder respectively.

Figure 3:
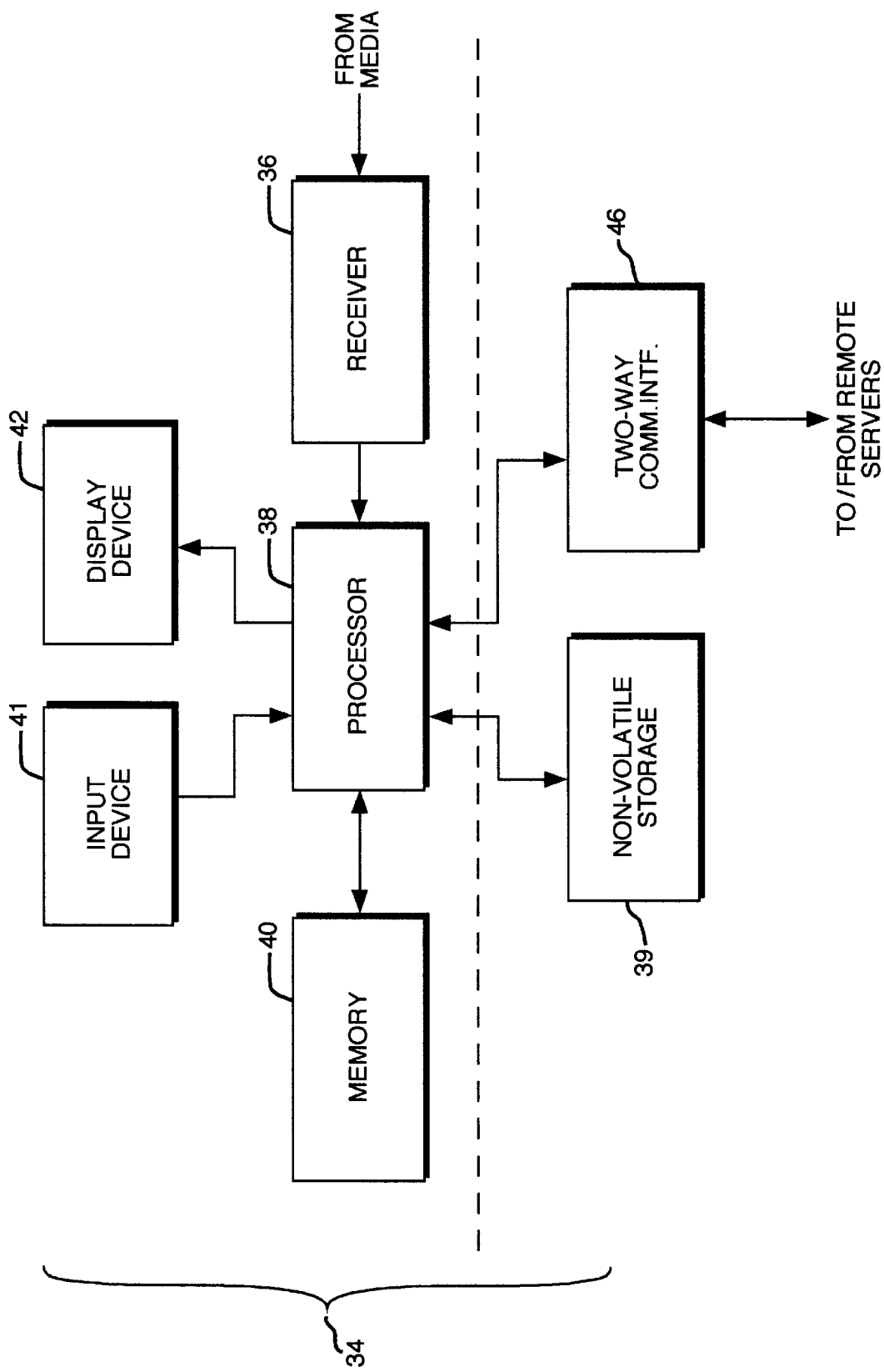
FIG. 3 is a block diagram showing the basic and some optional elements for forming various embodiments of the data streams consumption aspect of the system.

FIG. 3 illustrates the basic and some optional elements for forming various embodiments of the data streams consumption aspect of the system. Reference numeral 34 generally indicates these basic and optional equipment present at the consumer's location. Receiver 36 is used to receive the data streams. Receiver 36 may be an add-in adapter board, a television or radio broadcast receiver, a cable television converter or a satellite receiver for digital broadcast. Connected to receiver 36 is a microprocessor 38 for processing the received data streams. Connected to microprocessor 38 is memory 40 which is used as temporary storage by microprocessor 38. Memory 40 is typically semiconductor RAM. Also connected to microprocessor 38 are human interface devices for rendering the primary and associated data, as well as inputting associated data requests. Human interface devices include input device 41 and display device 42. Additionally, optional non-volatile storage media 39 such as a hard disk may be provided for caching received associated data, as well as two way communication interface 46 for accessing remote servers may be included in forming the various embodiments of the data streams consumption aspect of the system. Two way communication interface 46 may be an interface that accesses the remote server over such media as the analog telephone network, the ISDN digital network, a wide area packet switched network such as X25, frame relay or asynchronous transfer mode.

Recall that the delivery media may be radio frequency electromagnetic waves passing through the atmosphere, a video tape, a laser disk, an audio CD and the like. For the later media, receiver 36 becomes a VCR, laser disk player or an audio CD player respectively.

Figure 4:
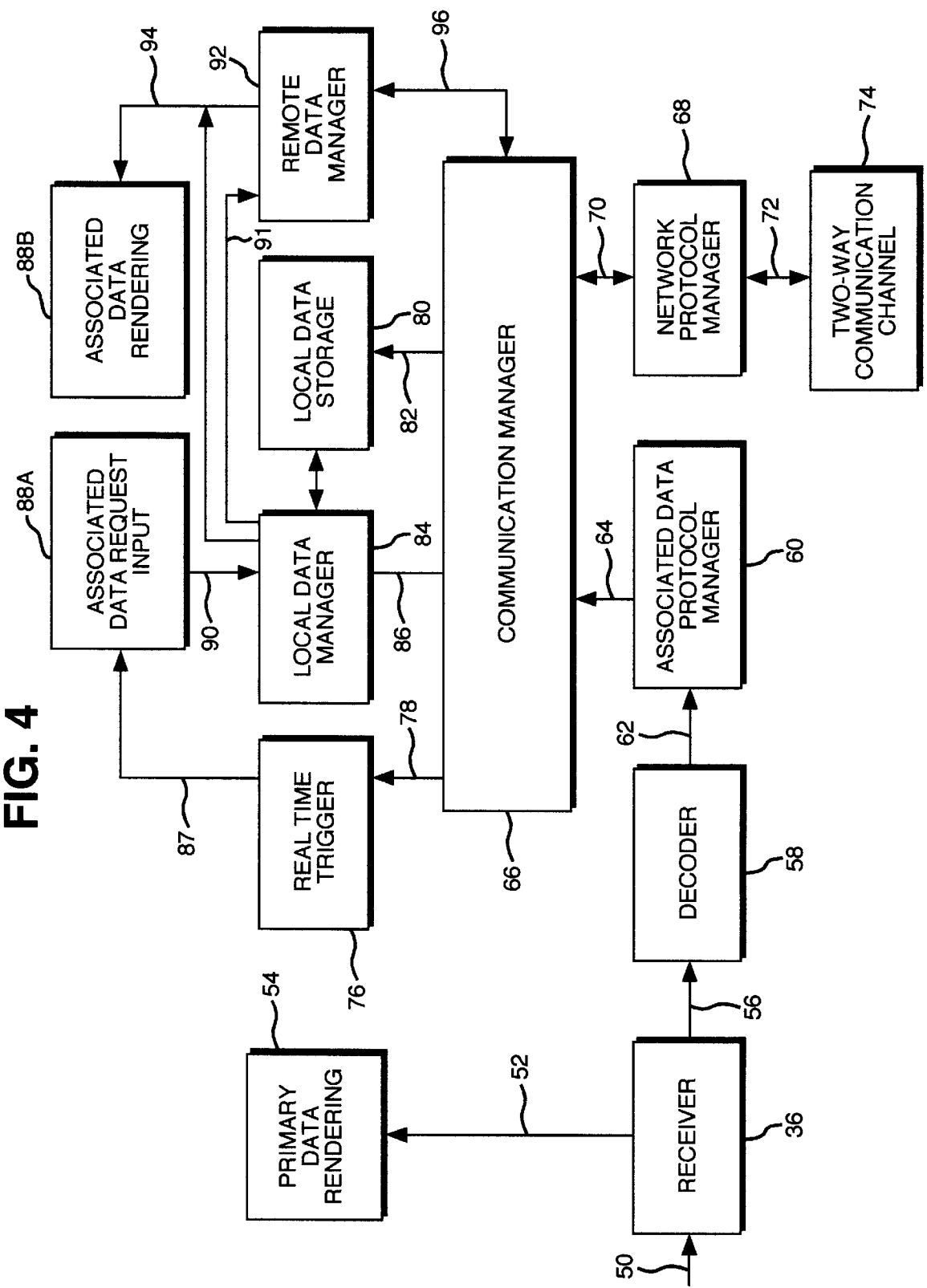
FIG. 4 is a block diagram showing a functional view of the various embodiments of the data streams consumption aspect of the system.

FIG. 4 is a high level block diagram showing a functional view of the various embodiments of system 34 formed with the basic and optional elements of FIG. 2. Referring now to FIG. 4, receiver 36 receives the primary and associated data streams from the delivery media, e.g. radio frequency waves, from input 50. Receiver 36 demodulates the input signal and supplies the primary data stream signal over data path 52 to primary data rendering sub-system 54 and the associated data signal over data path 56 to associated data decoder 58.

Primary data rendering sub-system 54 performs the function of presenting the primary data stream to the consumer in the manner in which a typical consumer would expect to see the data presented. For example, in the case of television, the primary data rendering takes the form of a video image typically supplied by a cathode ray tube screen, or possibly a liquid crystal display screen and audio provided by an audio amplifier and speakers. A second example is a broadcast radio demodulator, amplifier and speakers that renders radio waves received via radio broadcasting audible to a consumer. Yet a third example is a stereo system that renders data encoded on compact disk or tape audible to the consumer.

Decoder 58 performs the function of decoding the associated data from the delivery media. In one embodiment, decoder 58 consists of an analog to digital converter that converts analog encoded digital data back to digital format.

Associated data protocol manager 60 is connected by one-way data path 62 to decoder 58 and by one-way data path 64 to communications manager 66. Associated data protocol manager 60 performs the function of extracting the different forms of associated data from the incoming digital data stream and converting them to a form that can be used by communications manager 66. The types of associated data protocols include World Wide Web pages, closed captioning, stock quotes, sports scores, control commands for microprocessor 38 (of FIG. 3) to execute.

Communications manager 66 performs the function of a common network interface by receiving data from several different types of communication devices using different data transmission protocols. Such devices include telephone modems, ISDN modems, cable modems, wireless modems, satellite modems, a broadcast TV, radio and the like. Communication manager 66 converts all data received, regardless of the source and protocol, into a standard format that can then be utilized by the rest of the system. This function may be implemented in at least one of two ways. Proprietary interfaces between the communication components may be designed, or standard industry interfaces such as Microsoft Windows (a trademark of Microsoft Corporation) sockets may be used. In one embodiment, Windows sockets are used. A Windows socket is a standard application interface to access network data.

Real time trigger 76 is connected to communications manager 66 by one-way data path 78 and to associated data request input driver 88*a* by data path 87. Associated data request input driver 88*a* provides the consumer with the ability to input associated data requests to the system. In one embodiment, associated data request input driver 88*a* interfaces to a keyboard and alternate input devices such as a mouse to facilitate associated data request inputs from a user.

Real time trigger 76 accepts commands sent as part of the associated data to display a page of information without the user asking for it. The output of real time trigger is a command sent over data path 87 to associated data request input driver 88*a* which causes the page of information to be displayed. For example, a broadcaster may want viewers to see a certain page of information as part of a program that is being viewed. Real time trigger allows data to be displayed using the same data protocols as consumer requested information.

Local data storage 80 is connected to communications manager 66 by one-way data path 82 and by data path 83 to local data manager 84. The hardware implementation for local data storage 80 may be one or more of the following; RAM, disk, tape, recordable CD-ROM.

Local data manger 84 is connected to communications manager 66 by data path 86 and to associated data request input driver 88*a* and associated data rendering driver 88*b* by data paths 90 and 94. Local data manager 84 receives commands from associated data request input driver 88*a* to retrieve associated data from local data storage 80 and sends that data to associated data rendering driver 88*b* for presentation to the consumer. For example, a "Web Browser" may be used to display data pages from the World Wide Web (the "WWVW"). Providers of WWW browsers include Netscape Communications Corp., America Online, Spyglass and others. Local data storage 80 will typically be of limited capacity. Thus, local data manager 84 purges older and less used information. This is accomplished by assigning an expiration date and/or a priority to associated data files. The criteria for determining which data to purge is settable by the broadcaster and/or the consumer. Criteria include total amount of storage available, size of associated data files, expiration date and priority.

Remote data manager 92 (which is included in embodiments provided with the optional ability to access remote servers) is connected to local data manager 84, associated data rendering driver 88*b*, and communications manager 66 by data paths 91, 94 and 96 respectively. Remote data manager 92 receives commands from local data manger 84 to obtain data from remote computers through two-way communications channel 74 and send that data to associated data rendering driver 88*b* for presentation to the consumer. Local data manager 84 provides the commands to remote data manager 92 when it receives requests for associated data that are not cached in the local storage.

Network protocol manager 68 (which is included in embodiments provided with the optional ability to access remote servers) is connected to by two-way data path 70 to communications manager 66 and by two-way data path 72 to two-way communication channel 74. Network protocol manager 68 performs the function of formatting data received and transmitted over two-way communication channel 74. It contains the various protocols required to communicate with remote computers. Again, operating systems such as Microsoft's Windows typically provide network protocol managers with plug in modules called drivers to support different protocols and different communication hardware. Network protocol manager 68 extracts incoming data from two-way communication channel 74 using a network protocol appropriate for the medium supported by two-way communication channel 74. Network protocol manager 68 also encodes output data using the appropriate protocol and passes the data onto two-way communication channel 74 for transmission to third party computers.

Two-way communications channel sub-system 74 provides the function for connecting the client system interactively to remote computers that may be server machines, machines at online service providers, the Internet or independent Bulletin Board Systems ("BBS"). The network to which two-way communication channel 74 is connected may be a conventional switched analog telephone system interfaced to a modem, a digital switched system such as ISDN interfaced to an appropriate adapter card, a wide area network connected through an access device, satellite technologies, and the like. A two-way communications line is used to retrieve and access information that has only thus far been received by the client system in the form of references, which are pointers to where the information actually resides.

The embodiment illustrated in FIGS. 2–4 operates in the following manner. A primary data stream is generated. Associated data is separately generated. A script is generated that synchronizes how the primary and associated data are linked together. The primary data, the associated data and the script are sent to sequencer 14 where they are combined. The primary data is transmitted in the conventional fashion of its delivery medium. In the television model, this is broadcast over the air or on cable. The associated data is generally (but not always) sent by the same delivery medium as the primary data. In the case of television, the associated data is encoded in the VBI of the television signal. The signal is received by the consumer's equipment. The primary data stream is immediately rendered and the associated data is stored in local data storage 80. At any time, the consumer may browse the data stored in local data storage. This data will have been professionally selected to provide an enhanced viewing experience. For example, a difficult to find data sources providing historical background to a program will have been previously researched by the associated data provider and sent as associated data. The human interface is user friendly and will allow the consumer to browse through the associated data. This might start with a menu of available information from which the consumer could select just as if the data were coming from an online service. But the data is actually stored locally. And it arrived in local storage by being transmitted with the primary data stream. The consumer may process the associated data in a variety of ways including sorting and indexing relevant information.

The addition of a two-way communication channel allows a consumer to also access online services. In such an embodiment, associated data may consist of references such as uniform resource locations ("URL") which are WWVV page references. Associated data may include references to Internet News Groups which are shared static messages grouped by topic which may be accessed. Associated data may also include references to Internet Relay Chat areas which are multi-person dynamic conversation streams that enable users to communicate by text messages. Or, associated data may include pointers to information on an online service such as America Online, Prodigy or Compuserve. Thus, a menu may list several references. And by clicking on a reference, the system actually connects to and retrieves the referenced information from the appropriate source.

Alternatively, the associated data may itself include not only pointers to information on various online services, but the actual information which the associated data provider has acquired from an online service or source and incorporated into the associated data prior to its delivery to the consumer. For example, the associated data may contain actual Internet News Group messages related to the primary data stream. Thus, even if the consumer does not have a two-way communications channel or chooses not to use it, the invention provides the appearance and feel of an interactive connection to remote sources of relevant information.

FIGS. 5a–5d illustrate various exemplary embodiments of the data streams consumption aspect of the system that can be formed with the basic and optional elements of FIG. 3. For the exemplary embodiment illustrated in FIG. 5a, receiver 36, microprocessor 38 and memory 40 are combined to form exemplary computer 35. Exemplary computer 35 is also provided with optional non-volatile storage 39 as well as two way communication interface 46. Computer 35 receives the primary and associated data streams, decodes and separates the data streams, and renders the primary data with or without the associated data using display 42, as requested by the user. User input device 43 is used to provide the associated data request inputs to exemplary computer 35. Exemplary computer 35 is intended to represent a broad category of general as well as special purpose computers known in the art. Display 42 is typically a monitor, whereas user input device 43 is a keyboard with or without a complementary cursor control device.

Figure 5A:
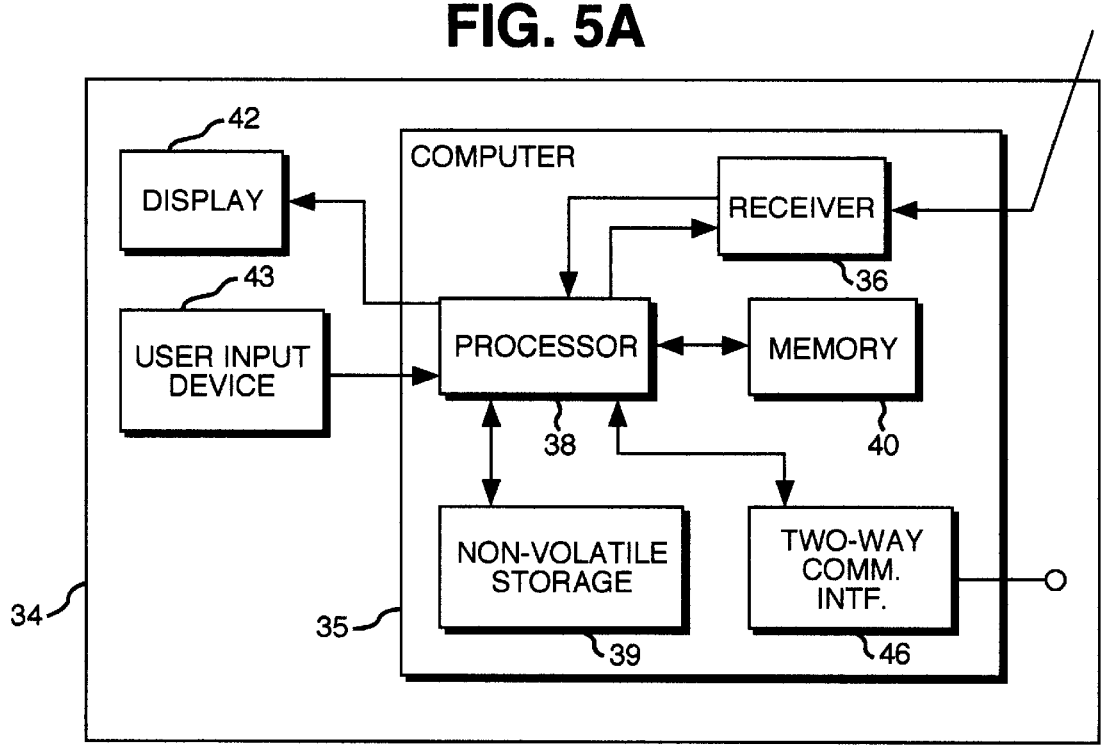
FIGS. 5a–5d are block diagrams illustrating various exemplary embodiments of the data streams consumption aspect of the system.
Figure 5B:
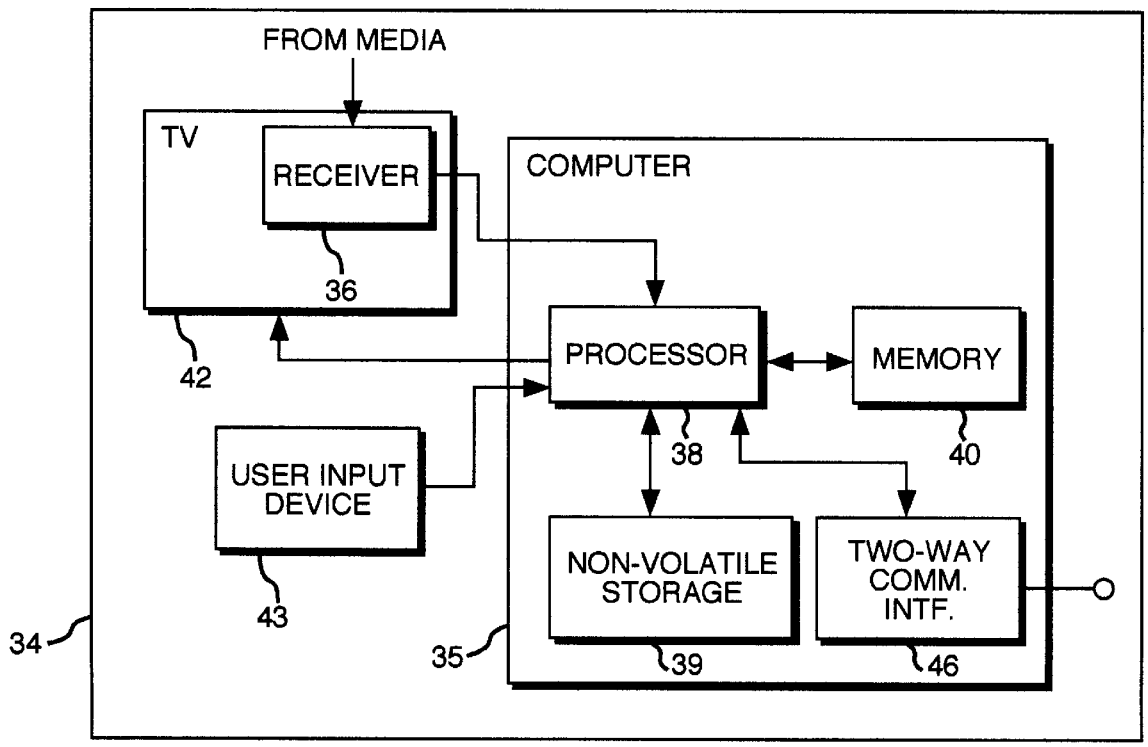

FIG. 5b illustrates an alternate embodiment. The difference between the embodiments illustrated in FIG. 5a and 5b is the fact that exemplary computer 35 is formed without receiver 36, and television 42 with receiver 36 is used as a display for the primary and associated data instead. For this embodiment, exemplary computer 35 receives the primary and associated data streams through receiver 36 of TV 42. Exemplary computer 35 decodes and separates the primary and associated data streams, and renders the primary data with or without the associated data, as described earlier.

Figure 5C:
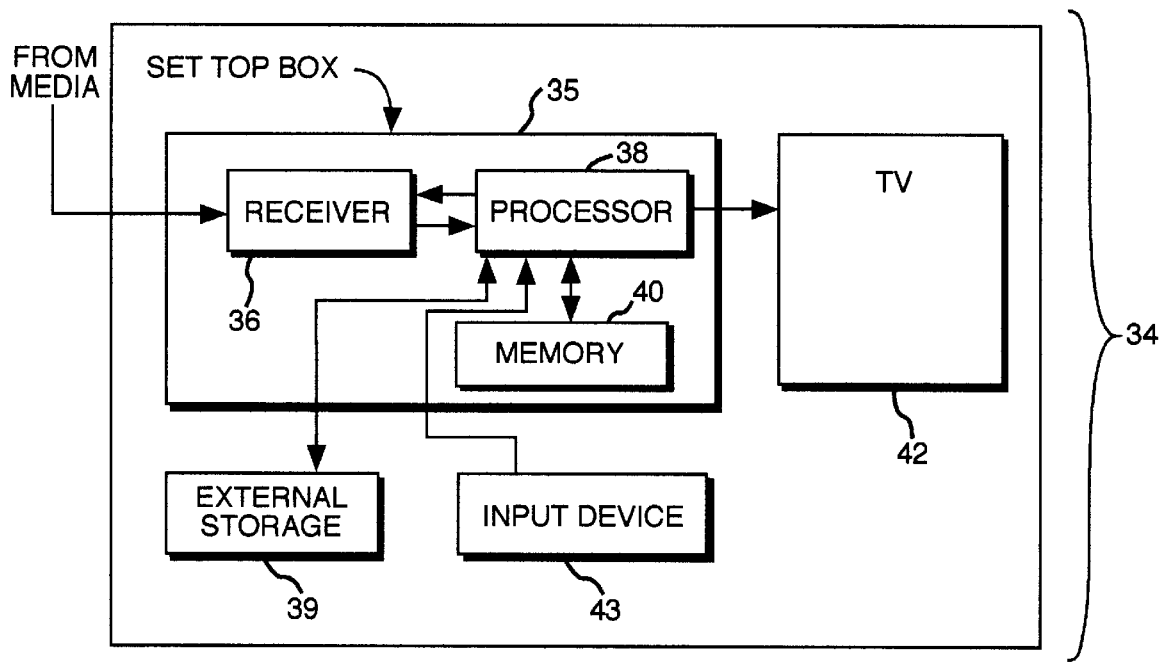

FIG. 5c illustrates yet another alternate embodiment. In FIG. 5c, TV tuner 36, microprocessor 38, memory 40 and CRT 42 are used to form exemplary set top box 35. For the illustrated embodiment, set top box 35 is complemented with optional external storage device 39. While not shown, set box 35 may also be provided with optional two way communication interface 46. Similar to the earlier embodiments, exemplary set top box 35 receives the primary and associated data streams, decodes and separates the data streams, and renders the primary data with or without the associated data using TV 42, as requested by the user. User input device 43 is used to provide the associated data request inputs to exemplary set top box 35.

Figure 5D:
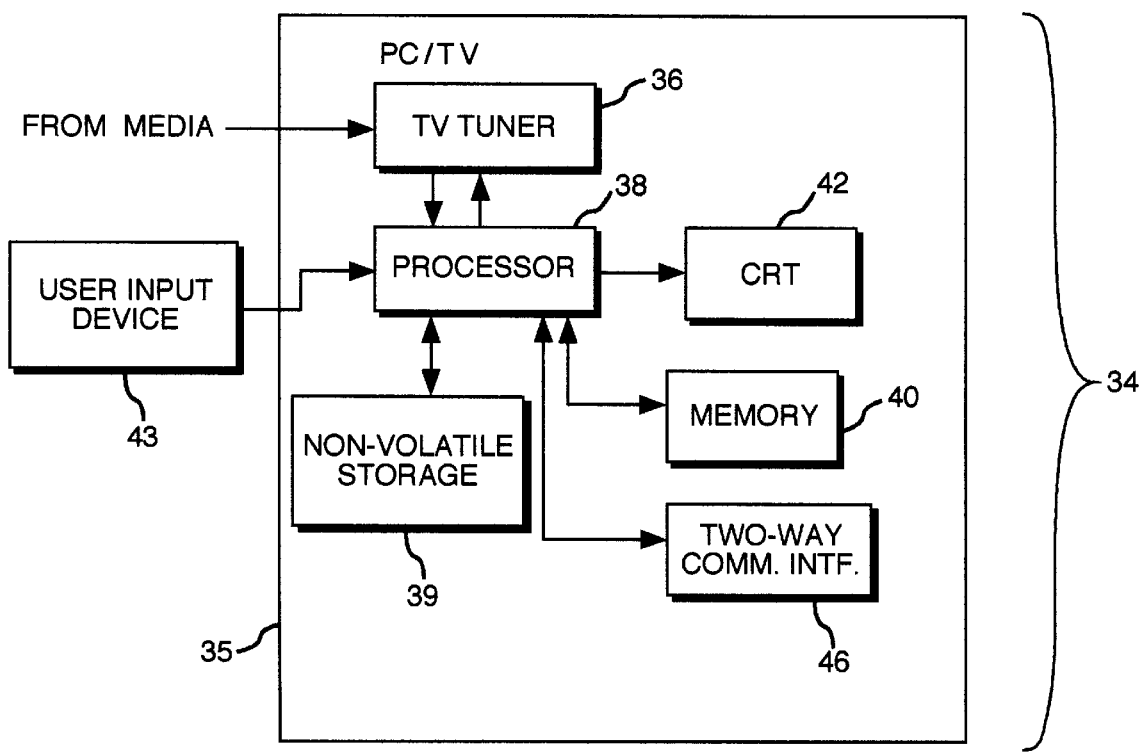

FIG. 5d illustrates yet another alternate embodiment. In FIG. 5d, receiver 36, microprocessor 38 and memory 40 are used to form exemplary PC/TV 35 (i.e. a TV with integrated digital computing capability). For the illustrated embodiment, exemplary PC/TV 35 is also provided with optional non-volatile storage device 39 and two way communication interface 46. Similar to the earlier embodiments, exemplary PC/TV 35 receives the primary and associated data streams, decodes and separates the data streams, and renders the primary data with or without the associated data using CRT 42, as requested by the user. User input device 43 is used to provide the associated data request inputs to exemplary PC/TV 35.

Figure 6:
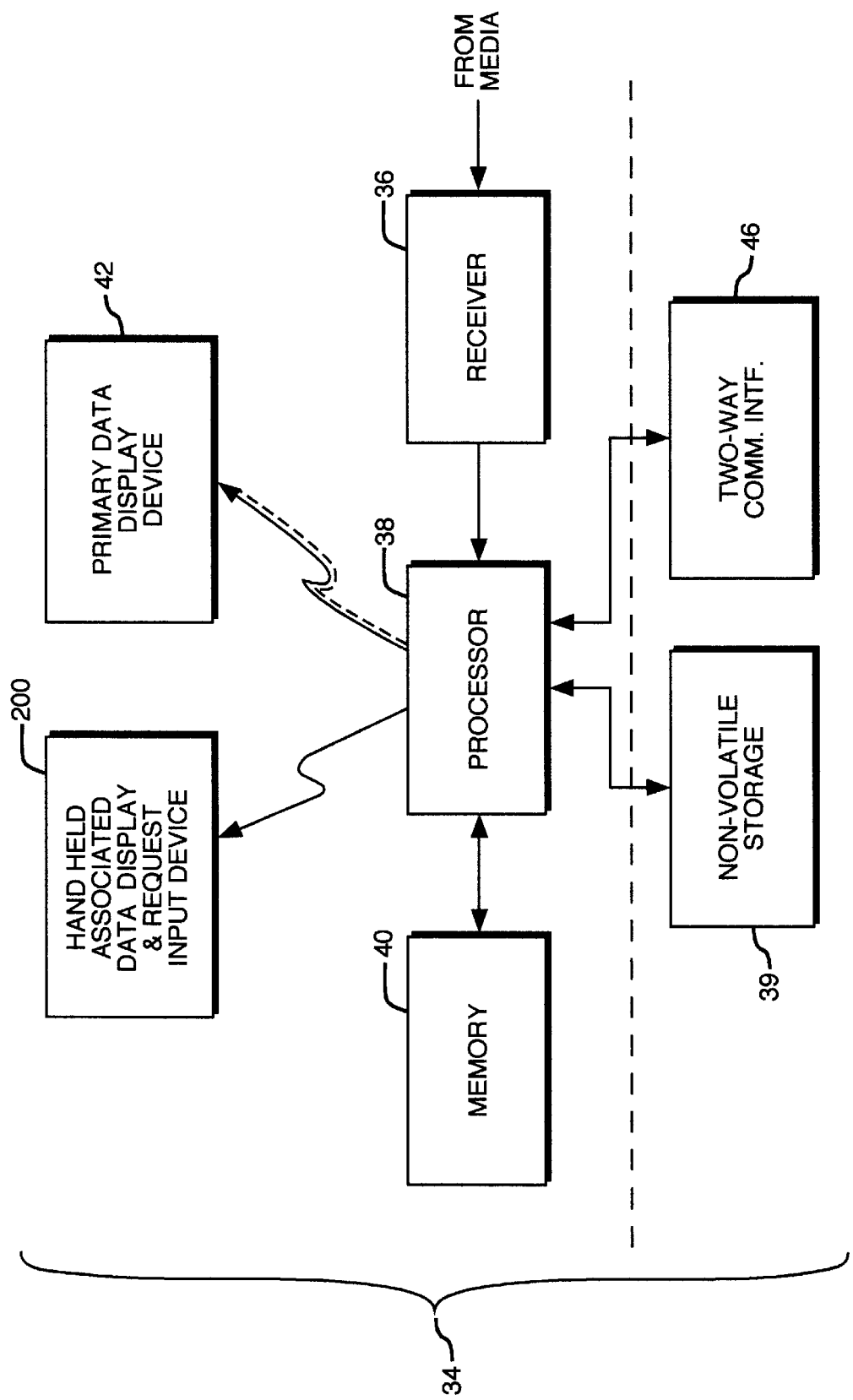
FIG. 6 is a block diagram illustrating alternate basic and optional elements for forming various embodiments for the data streams consumption aspect of the system.

FIG. 6 illustrates an alternate collection of basic and optional elements for forming the various embodiments of the data streams consumption aspect of the system. The difference between the elements illustrated in FIG. 6 and the elements illustrated in FIG. 3 is the fact that at least two separate display devices, 42 and 200, are employed to render the primary and the associated data. Preferably, associated data display device 200 is an integrated hand held associated display and request input interface device. In other words, associated data interface device 200 is a display as well as an input device, having a relatively small form factor suitable for hand held operation. In one embodiment, integrated hand held associated data interface device 200 is a wireless device. In other words, integrated hand held associated data interface device 200 communicates with processor 308 through the wireless medium. Additionally, by virtue of the employment of separate display device 200 to render the associated data, primary data display device 42 may be "loosely coupled" to processor 38 or even decoupled from processor 38.

Figure 7:
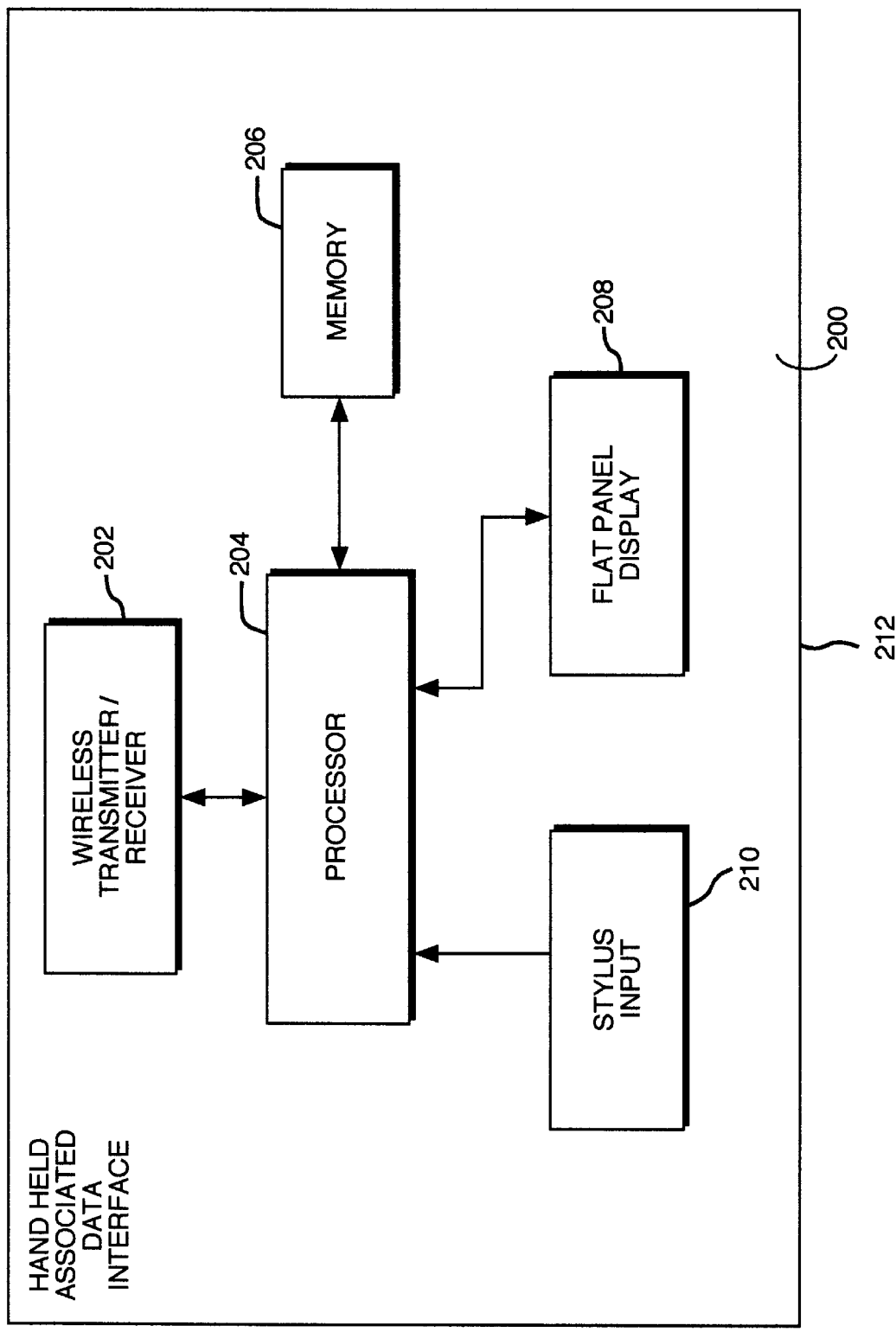
FIG. 7 is a block diagram illustrating one embodiment of the hand held associated data display and request input device of the present invention.

FIG. 7 illustrates an exemplary embodiment of the integrated associated data display and request input interface device. As shown, integrated associated data display and request input interface device 200 includes communication interface 202, microprocessor 204, memory 206 and display element 208, coupled to each other as shown. These elements are packaged with enclosure 212 having physical dimensions consistent with hand held devices known in the art, to allow a user to comfortably operate the device while holding the device in his/her hands. For the illustrated embodiment, exemplary integrated associated data display and request input interface device 200 is also provided with stylus input 210 to allow a user to interact with a graphical end-user interface to provide associated data request inputs. Furthermore, communication interface 202 is a wireless transmitter/receiver, whereas display element 208 is a flat panel display. Elements 202–210 are intended to represent a broad category of these elements known in the art. In particular, microprocessor 204 are intended to represent 8-bit micro-controllers, 16-bit DSP processors, as well as 32-bits or greater general purpose microprocessors.

Figure 8:
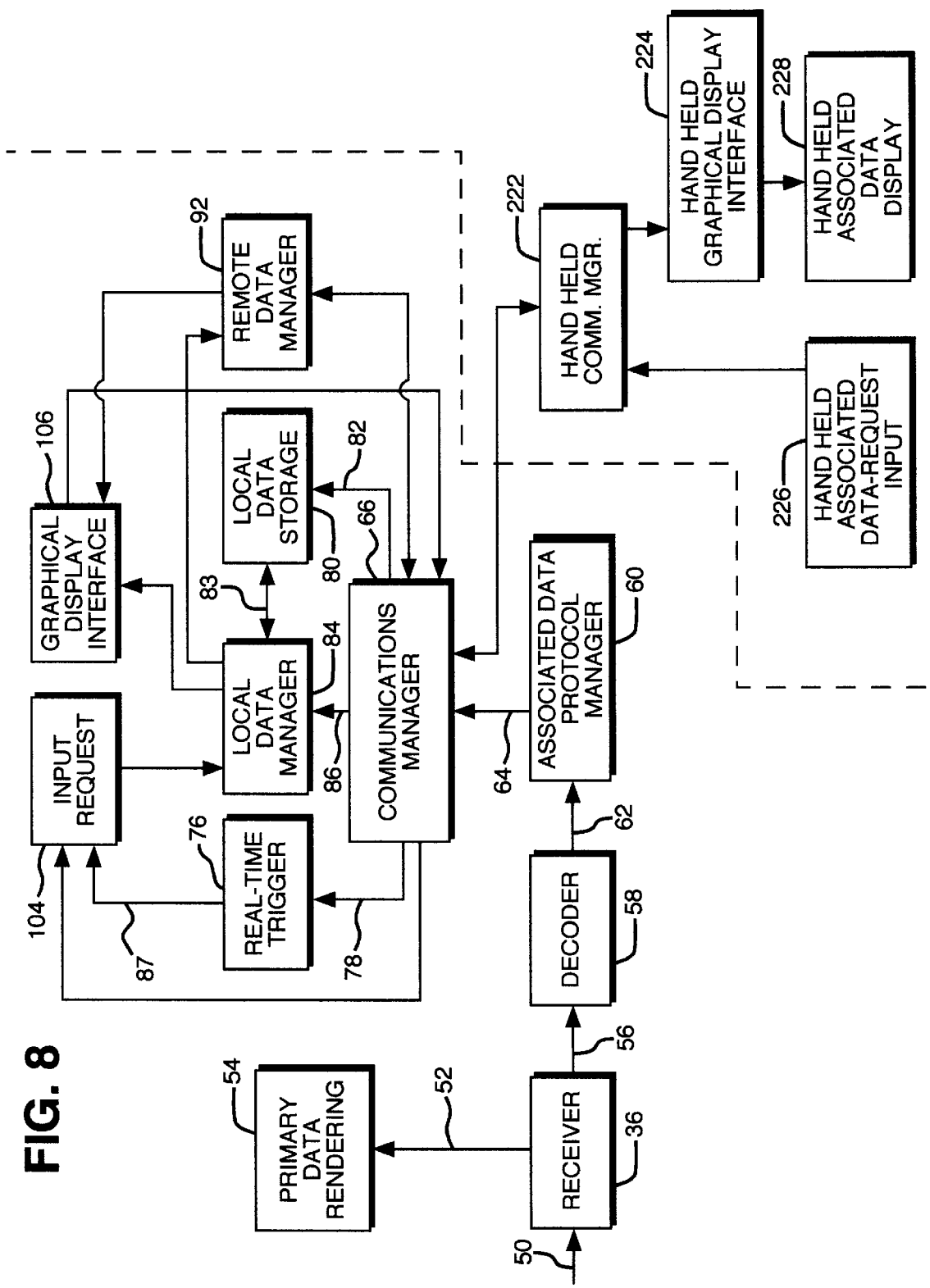
FIG. 8 is a block diagram showing a functional view of the various embodiments of the data streams consumption aspect of the system.

FIG. 8 illustrates an alternate functional view of data stream consumption aspect of the system, when a separate display device having its own processor is employed to render the associated data. FIG. 8 differs from FIG. 4 in that local data manager 84 and remote data manager 92 invoke graphical display interface 106 to render the associated data. Instead of rendering the associated data on a physically coupled display device, graphical display interface 106 provides the graphical rendering commands to communication manager 66, which in turn transmits them, over the wireless medium, to communication manager 222 of the integrated hand held associated data display and request input interface device 200.

Over in the integrated associated display and request input interface 200, communication manager 222 receives and forwards the graphical rendering commands to graphical display interface 224, which in turns executes the commands, causing the associated data to be rendered on the associated data interface device 200.

Additionally, data request input driver 226 forwards any associated data request inputs it receives from the user to communication manager 222 for transmission, over the wireless medium, to "host" communication manager 66. Over in the "host" system, communication manager 66 receives and forwards the associated data request inputs to local data manager 84 through input request driver 104. Local data manager 84 in turns processes the received associated data request inputs as described earlier.

FIGS. 9a–9d illustrate various exemplary embodiments of the data streams consumption aspect of the system that can be formed with the basic and optional elements of FIG. 6. The exemplary embodiments are similar to those of FIG. 5a–5d, except for the employment of the integrated wireless hand held associated data interface 200, and the provision of wireless transmitter/receiver 102 to the computer, set top box or PC/TV, to facilitate wireless communication between the "host" system and the wireless hand held associated data interface.

Figure 9A:
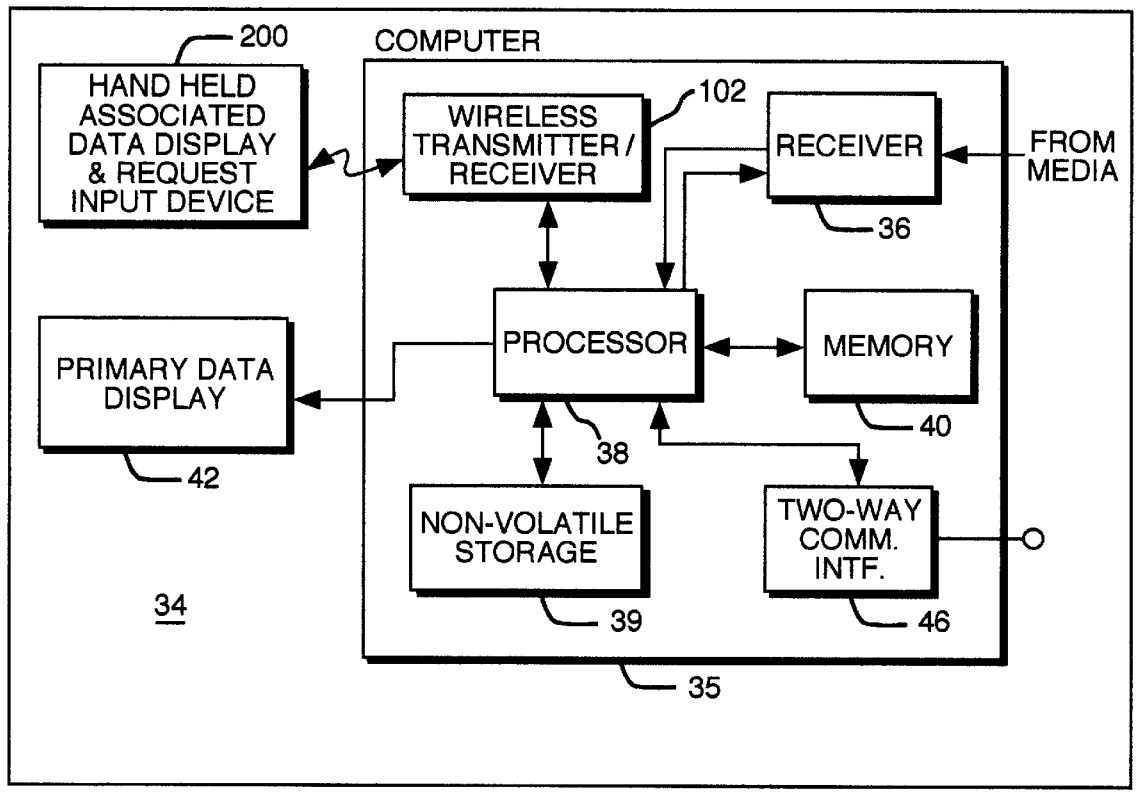
FIGS. 9a–9d are block diagrams illustrating various alternate exemplary embodiments of the data stream consumption aspect of the system.

In FIG. 9a, receiver 36, microprocessor 38 etc., together with wireless transmitter/receiver 102, are employed to form exemplary computer 35. Exemplary computer 35 first receives the primary and the associated data, then decodes and separates the associated data from the primary data, as exemplary computer 35 of FIG. 5a. However unlike the earlier described embodiment, exemplary computer 35 of FIG. 9a renders the primary data on display 42, and transmits the commands for rendering the associated data, through the wireless medium, to integrated wireless hand held associated data interface 200, to cause the associated data to be rendered.

Figure 9B:
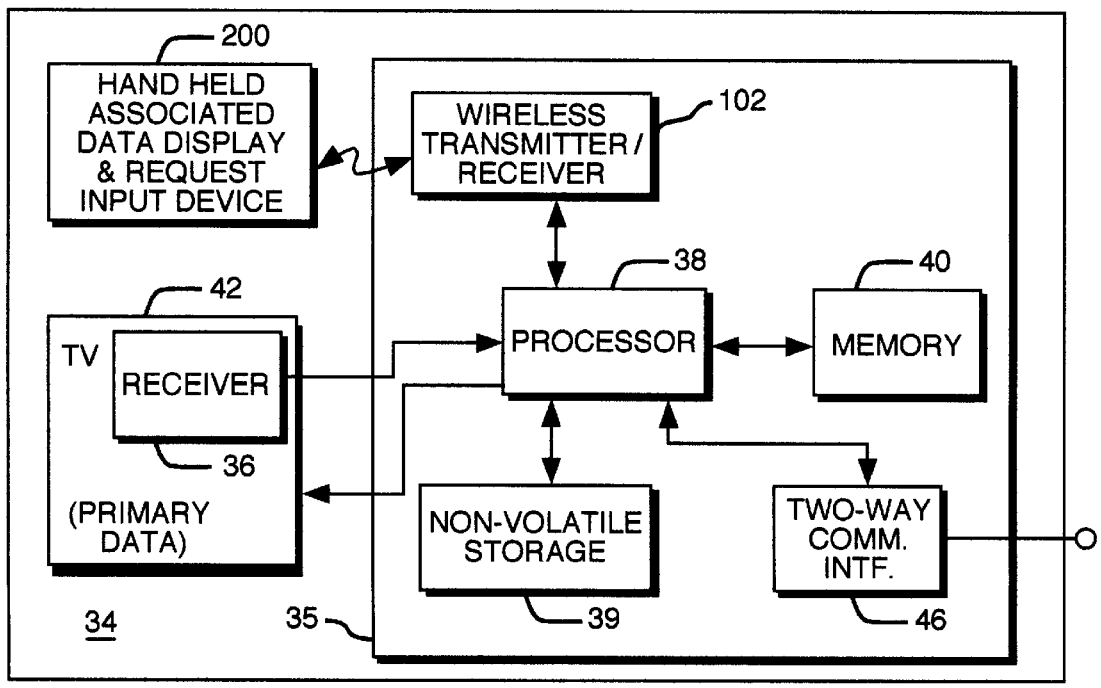

In FIG. 9b, microprocessor 38 etc., together with wireless transmitter/receiver 102, are employed to form exemplary computer 35. Exemplary computer 35 first receives the primary and the associated data using receiver 36 of TV 42, then decodes and separates the associated data from the primary data, as exemplary computer of FIG. 5b. However unlike the earlier described embodiment, exemplary computer 35 renders the primary data on TV 42, but transmits the commands for rendering the associated data, through wireless medium, to integrated wireless hand held associated data interface 200, to cause the associated data to be rendered.

Figure 9C:
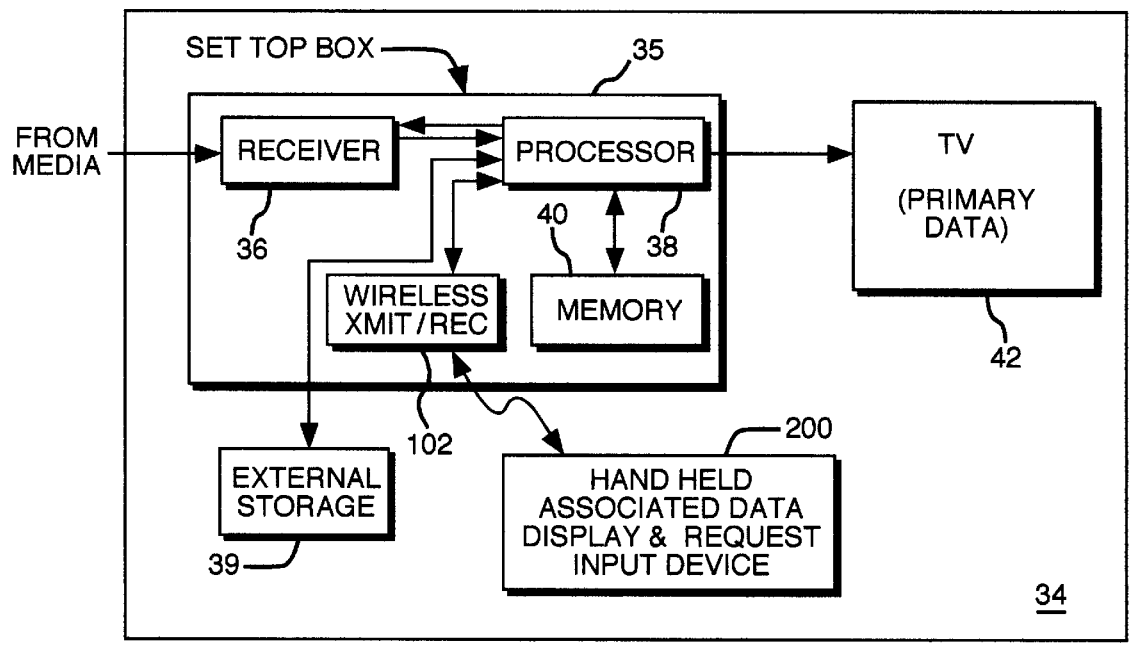

In FIG. 9c, receiver 36, microprocessor 38 etc., together with wireless transmitter/receiver 102, are employed to form exemplary set top box 35. Exemplary set top box 35 first receives the primary and the associated data using receiver 36 of TV 42, then decodes and separates the associated data from the primary data, as set top box 35 of FIG. 5c. However unlike the earlier described embodiment, exemplary computer 35 renders the primary data on TV 42, but transmits the commands for rendering the associated data, through the wireless medium, to integrated wireless hand held associated data interface 200, to cause the associated data to be rendered.

Figure 9D:
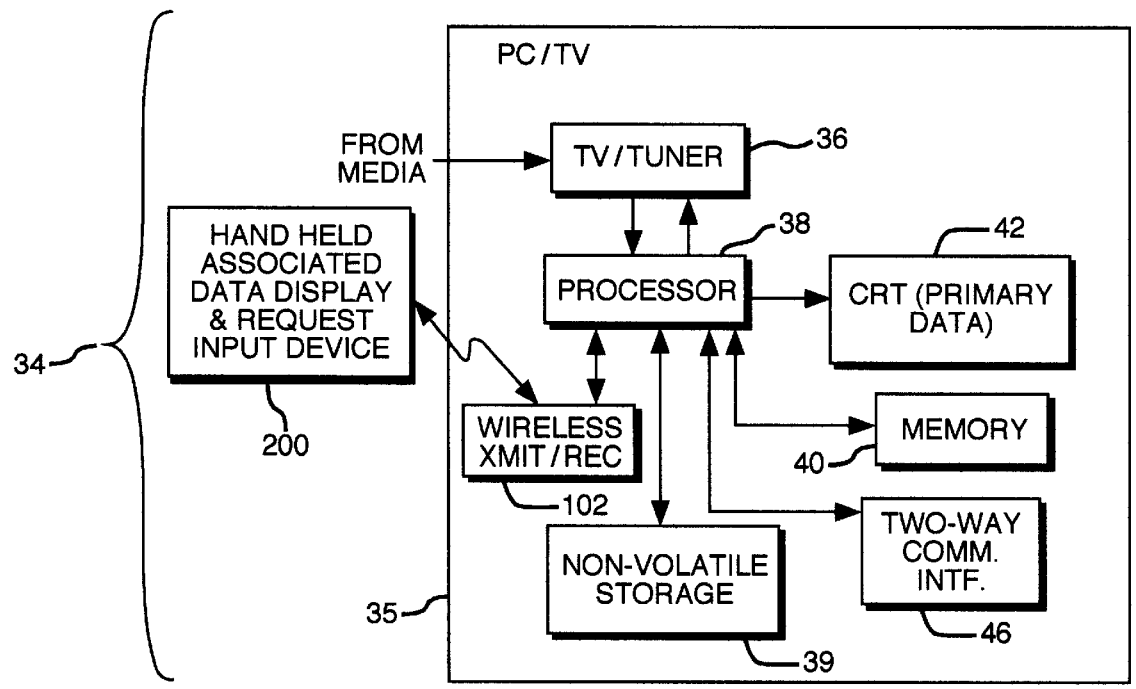

In FIG. 9d, TV tuner 36, microprocessor 38 etc., together with wireless transmitter/receiver 102, are employed to form exemplary PC/TV 35. Exemplary PC/TV 35 first receives the primary and the associated data, then decodes and separates the associated data from the primary data, as PC/TV 35 of FIG. 5d. However unlike the earlier described embodiment, exemplary PC/TV 35 renders the primary data on CRT 42, but transmits the commands for rendering the associated data, through the wireless medium, to integrated wirelss hand held associated data interface 200, to cause the associated data to be rendered.

In each of these embodiments, a user may selectively interact and consume the associated data holding the integrated wireless hand held associated data interface 200, while consuming the primary data rendered on a physically decoupled monitor or TV. Therefore, each of these embodiments advantageously enables a user to comfortably consume the primary and associated data, e.g. in a family room setting; an advantageous feature that is unavailable from the embodiments of FIG. 5a–5d.

Figure 10A:
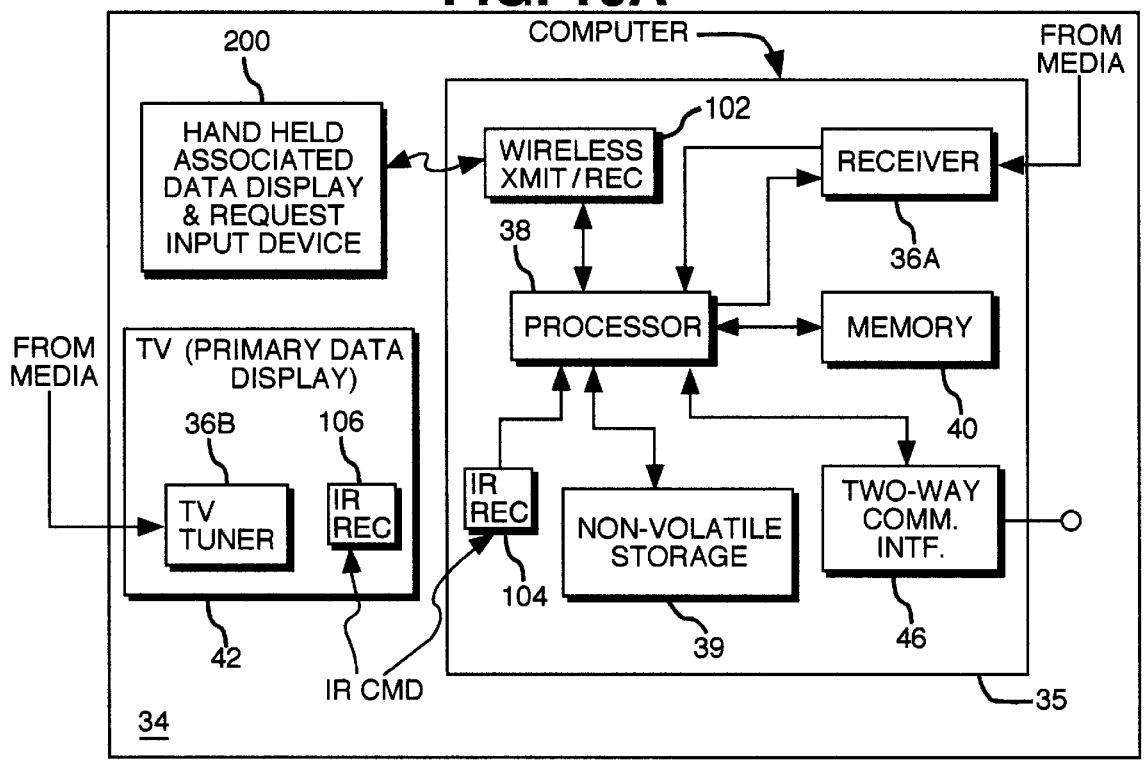
FIGS. 10a–10b are block diagrams illustrating further alternate exemplary embodiments of the data stream consumption aspect of the system.
Figure 10B:
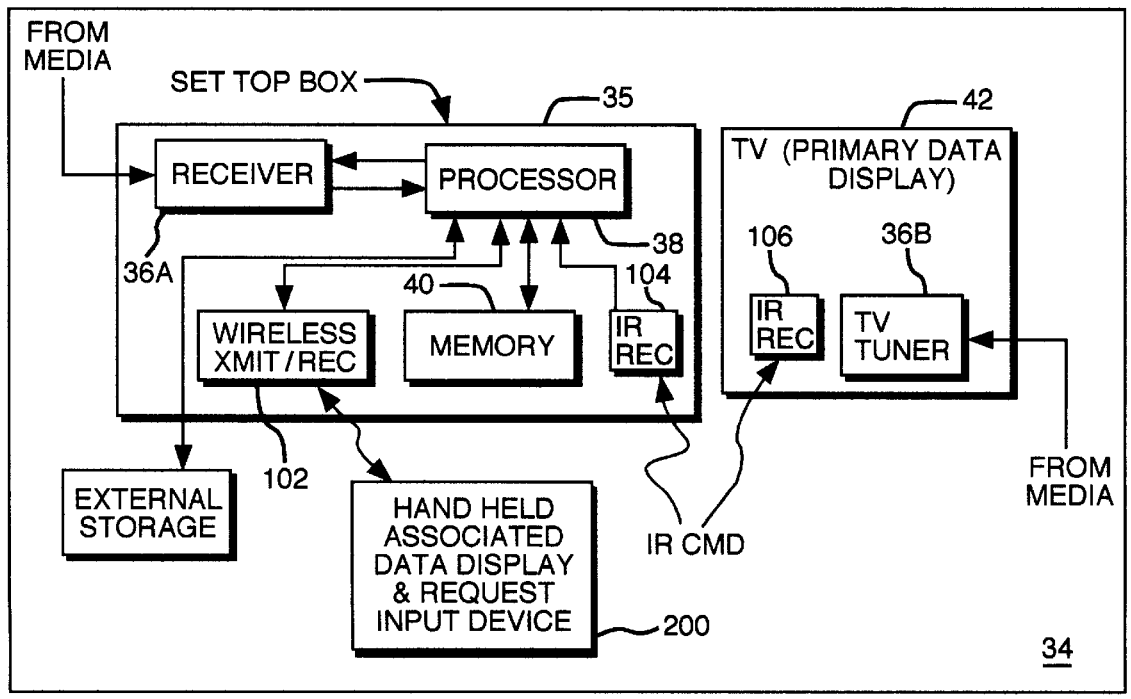

As alluded to earlier, with the employment of a separate display device to render the associated data, in particular, a wireless hand held device, the display device for rendering the primary data may be "loosely" coupled to the processor that processes the associated data. FIGS. 10a–10b illustrate two further alternate exemplary embodiments that can be formed using the alternate collection of elements illustrated in FIG. 6. In FIG. 10a, TV 42 employed to render the primary data includes IR receiver 106 for receiving remote control commands provided through the infrared spectrum, and exemplary computer 35 is similarly constituted as exemplary computer 35 of FIG. 9a, as well as provided with a compatible IR receiver 104. Thus, exemplary computer 35 can track the remote control commands provided to TV 42, in particular, channel tuning commands, allowing exemplary computer 35 to control its own receiver 36 to tune to the same channel to extract, and in turn to provide the correct associated data, through the wireless medium, to wireless hand held associated data interface 200. Accordingly, TV 42 and exemplary computer 35 may be decoupled, further facilitating comfortable consumption of the primary and associated data in e.g. a family room setting.

Likewise, in FIG. 10b, TV 42 employed to render the primary data includes IR receiver 106 for receiving remote control commands provided through the infrared spectrum, and exemplary set top box 35 is similarly constituted as exemplary set top box 35 of FIG. 9c, as well as provided with a compatible IR receiver 104. Thus, exemplary set top box 35 can track the remote control commands provided to TV 42, in particular, channel tuning commands, allowing exemplary set top box 35 to control its own receiver 36 to tune to the same channel to extract, and in turns to provide the correct associated data, through the wireless medium, to wireless hand held associated data interface 200,. Accordingly, TV 42 and exemplary set top box 35 may be decoupled, further facilitating comfortable consumption of the primary and associated data in e.g. a family room setting.

Figure 11A:
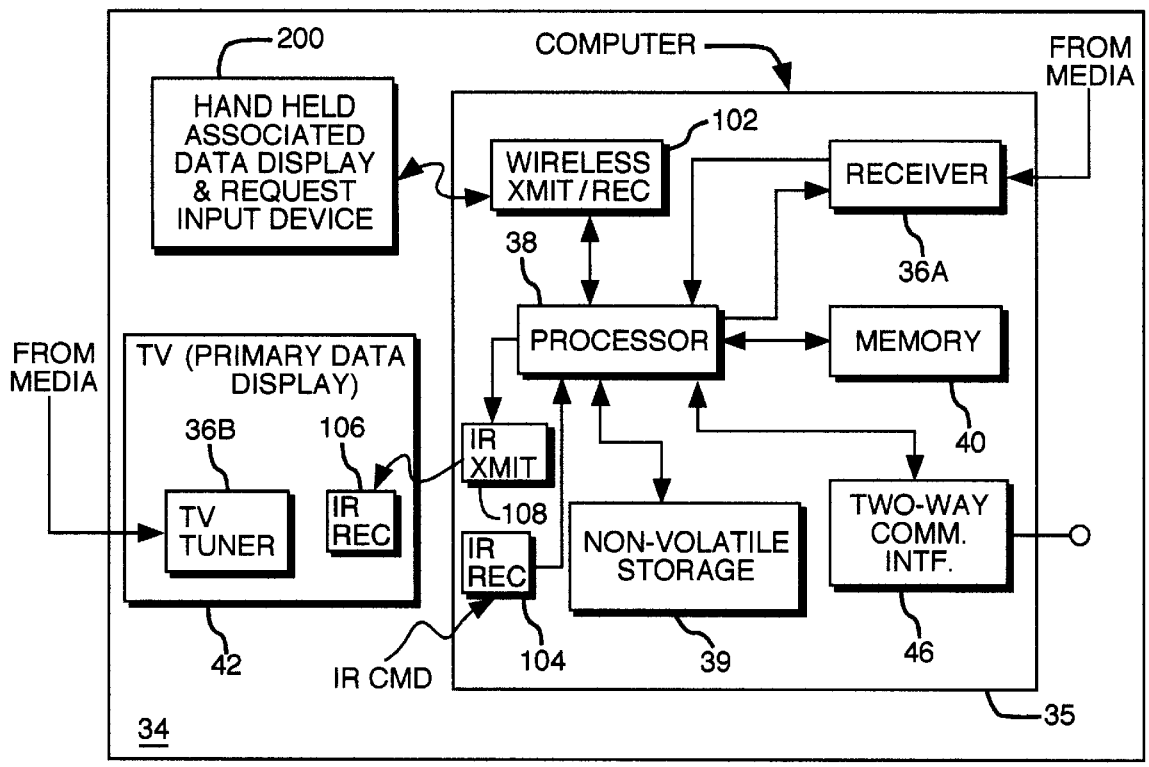
FIGS. 11a–11b are block diagrams illustrating further alternate exemplary embodiments of the data stream consumption aspect of the system.
Figure 11B:
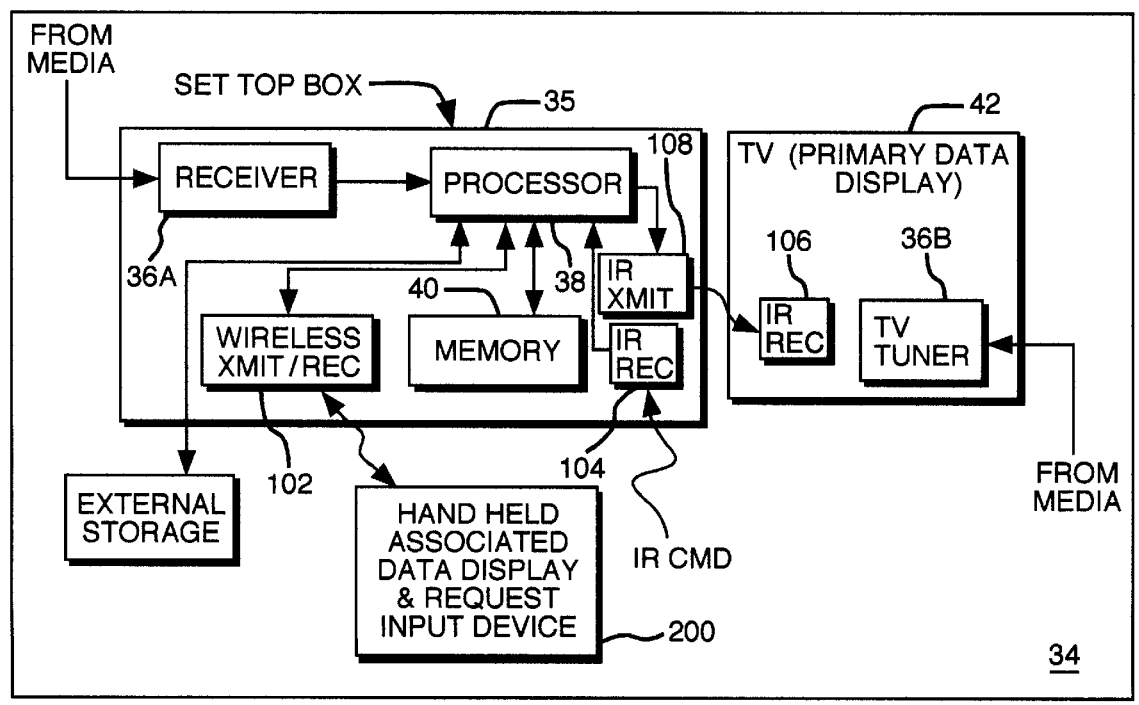

FIGS. 11a–11b illustrate two further alternate exemplary embodiments that can be formed using the alternate collection of elements illustrated in FIG. 6. Exemplary computer and set top box 35 of FIG. 11a–11b are similar to the embodiments of FIG. 10a–10b respectively, except each of exemplary computer and set top box 35 of FIG. 11a–11b is further provided with IR transmitter 108 to transmit remote control commands to control TV 42. Thus, instead of having to provide compatible IR receivers 104 and 106 to both TV 42 and exemplary computer/set top box 35, incompatible ones may be provided, as long as exemplary computer/set top box 35 is provided with the capability of transmitting remote control commands that are understandable to TV 42. Such ability can be provided for example by providing a universal remote control commands database to exemplary computer/set top box 35 of FIGS. 11a–11b. In other words, exemplary computer/set up box 35 of FIGS. 11a–11b may be advantageously used with a number of existing TV's to facilitate comfortable consumption of the primary and associated data in e.g. a family room setting.

The foregoing preferred embodiments are subject to numerous adaptations and modifications without departing from the concept of the invention. Therefore, within the scope of the appended claims, the invention may be practiced other than as specifically described herein.

What is claimed is:

1. An apparatus comprising:
   (a) a display element;
   (b) a processor coupled to the display element to cause associated data to be rendered on the display element responsive to received rendering commands of the associated data;
   (c) a communication interface coupled to the processor to receive the rendering commands of the associated data from a computer, the computer to receive the associated data in conjunction with primary data, and subsequently decode and separate the associated data from the primary data, said computer further to cause the primary data to be rendered on a different display apparatus; and
   (d) an enclosure to house the display element, the processors and the communication interface, the enclosure having physical dimensions on the order of a hand held device, suitable for hand held usage of the apparatus while viewing the primary data rendered on the different display apparatus.

2. The apparatus as set forth in claim 1, wherein the display element comprises a flat panel display.

3. The apparatus as set forth in claim 1, wherein the communication interface comprises a wireless communication interface.

4. The apparatus as set forth in claim 1, wherein
   the apparatus further comprises an input mechanism to facilitate associated data request inputs;
   the processor is further coupled to the input mechanism, the processor to forward the associated data request inputs to the communication interface; and
   the communication interface is further to forward the associated data request inputs to the computer.

5. The apparatus as set forth in claim 4, wherein the input mechanism comprises a stylus.

6. The apparatus as set forth in claim 4, wherein communication interface comprises a wireless transmitter/receiver.

7. The apparatus as set forth in claim 1, wherein the computer comprises a television and the different display apparatus is a CRT element of the television.

8. The apparatus as set forth in claim 1, wherein the host apparatus comprises a television and the different display apparatus comprises a CRT element of the television.

9. A system comprising:
   (a) a computer to receive primary and associated data, decode and separate the associated data from the primary data, and cause the primary and associated data to be separately rendered; and
   (b) a hand held device communicatively coupled to the computer to render the associated data, the hand held device having external physical dimensions that are suitable for hand held usage while viewing the separately rendered primary data.

10. The system as set forth in claim 9, wherein the hand held device comprises:
    (b.1) a communication interface to receive rendering commands of the associated data from the computer;
    (b.2) a processor coupled to the communication interface and an associated display element, the processor to cause the associated data to be rendered on the associated display element;
    (b.3) the associated display element; and
    (b.4) an enclosure to house the associated display element, the processor, and the communication interface, the enclosure having the external physical dimensions.

11. The system as set forth in claim 10, wherein the associated display element comprises a flat panel display.

12. The system as set forth in claim 10, wherein the communication interface comprises a wireless communication interface.

13. The system as set forth in claim 10, wherein
    the hand held device further comprises an input mechanism to facilitate associated data request inputs;
    the processor is further coupled to the input mechanism, the processor to forward the associated data request inputs to the communication interface; and
    the communication interface is further to forward the associated data request inputs to the computer.

14. The system as set forth in claim 13, wherein the input mechanism comprises a stylus.

15. The system as set forth in claim 13, wherein the communication interface comprises a wireless transmitter/receiver.

16. The system as set forth in claim 9, wherein the system further comprises a primary display device coupled to the computer to render the primary data.

17. The system as set forth in claim 9, wherein the computer comprises a television, and the primary data are rendered on a CRT element of the television.

18. An apparatus comprising:
    a display element;
    a processor coupled to the display element to cause associated data to be rendered on the display element responsive to received rendering commands of the associated data;

a communication interface coupled to the processor to receive the rendering commands of the associated data from a host apparatus, the host apparatus to receive the associated data in conjunction with primary data, and subsequently decode and separate the associated data from the primary data, the host apparatus further to cause the primary data to be rendered on a different display apparatus;

an input mechanism coupled to the processor to facilitate associated data request inputs, the processor to forward the associated data request inputs to the communication interface, and the communication interface to forward the associated data request inputs to the host apparatus; and an enclosure to house the display element, the processor, the communication interface, and the input mechanism, the enclosure having physical dimensions on the order of a hand held device, suitable for hand held usage of the apparatus while viewing the primary data rendered on the different display apparatus.

19. The apparatus as set forth in claim 18, wherein the display element comprises a flat panel display.

20. The apparatus as set forth in claim 18, wherein the communication interface comprises a wireless communication interface.

21. The apparatus as set forth in claim 18, wherein the input mechanism comprises a stylus.

22. The apparatus as set forth in claim 18, wherein communication interface comprises a wireless transmitter/receiver.

23. The apparatus as set forth in claim 18, wherein the host apparatus comprises a set top box.

* * * * *

UNITED STATES PATENT AND TRADEMARK OFFICE
CERTIFICATE OF CORRECTION

PATENT NO.   : 6,072,521
DATED        : June 6, 2000
INVENTOR(S)  : Harrison et al.

It is certified that error appears in the above-identified patent and that said Letters Patent is hereby corrected as shown below:

Column 8,
Line 5, delete ""WWVW"" and insert -- WWW --.

Column 9,
Line 27, delete "WWVV" and insert -- WWW --.

Signed and Sealed this

Twenty-fifth Day of February, 2003

JAMES E. ROGAN
*Director of the United States Patent and Trademark Office*